United States Patent [19]
Junike et al.

[11] 3,925,877
[45] Dec. 16, 1975

[54] APPARATUS FOR CHANGING THE TOOL HOLDERS CARRYING MOUNTED TOOLS ON A MACHINE TOOL

[75] Inventors: Wilhelm August Karl Junike; Hans-Joachim Koch, both of Hannover, Germany

[73] Assignee: Max Muller Brinker Maschinenfabrik Zweigniederlassung der Gildemeister Aktiengesellschaft, Langenhagen, Germany

[22] Filed: Apr. 11, 1974

[21] Appl. No.: 460,177

[30] Foreign Application Priority Data
Apr. 13, 1973  Germany............................ 2318778

[52] U.S. Cl. ............................................... 29/568
[51] Int. Cl.² ......................................... B23Q 3/155
[58] Field of Search ............................ 29/568, 26 A

[56] References Cited
FOREIGN PATENTS OR APPLICATIONS
2,031,219  1/1971  Germany ............................ 29/568
1,235,705  3/1967  Germany ............................ 29/568

Primary Examiner—J. M. Meister
Assistant Examiner—F. R. Bilinsky
Attorney, Agent, or Firm—Owen, Wickersham & Erickson

[57] ABSTRACT

Apparatus for changing tool holders carrying tools used on a machine tool such as a lathe having a primary slide and a secondary slide relatively adjustable transversely, and having a tool turret mounted on the secondary slide and having at least two tool holder clamping devices. A movable tool holder magazine is supported by the machine tool's main frame for sliding movement parallel to the primary slide. The magazine carrying a series of tool holders for movement around a closed loop having a straight portion lying parallel to the secondary slide and at least as long as the displacement range of the turret in the displacement direction of the secondary slide. The magazine can move any tool or vacant station to lie directly opposite to the change position of the turret. Tool holder transfer means is supported by the secondary slide for transferring tool holders between the magazine and the turret.

6 Claims, 4 Drawing Figures

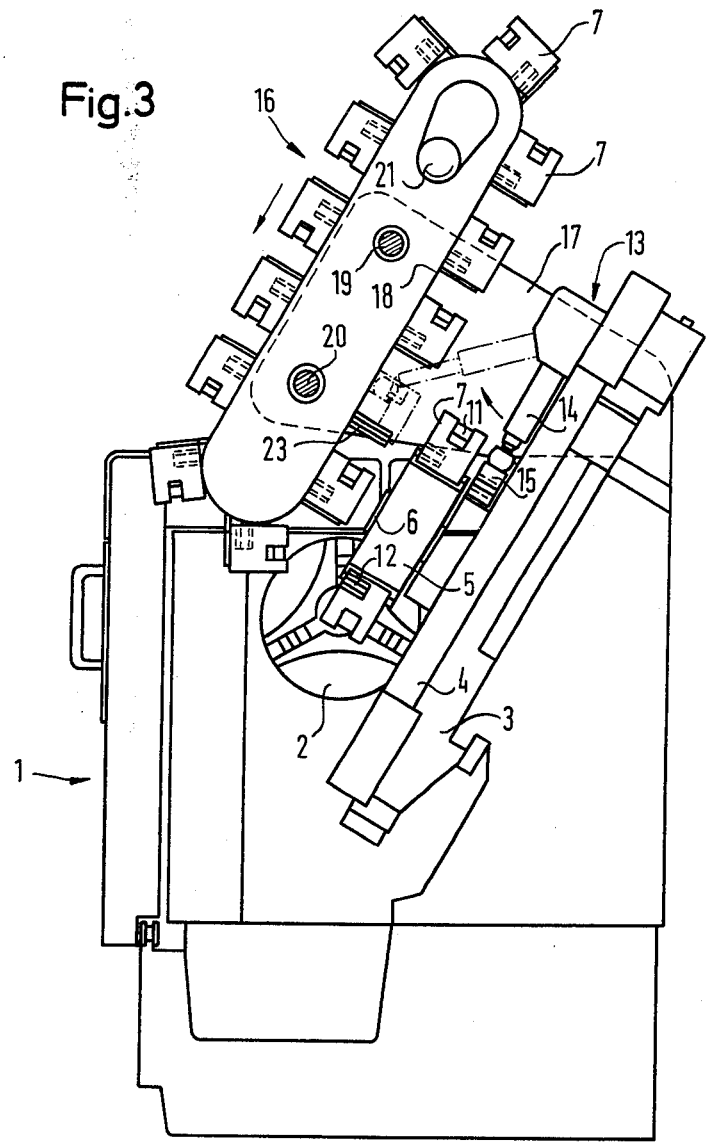

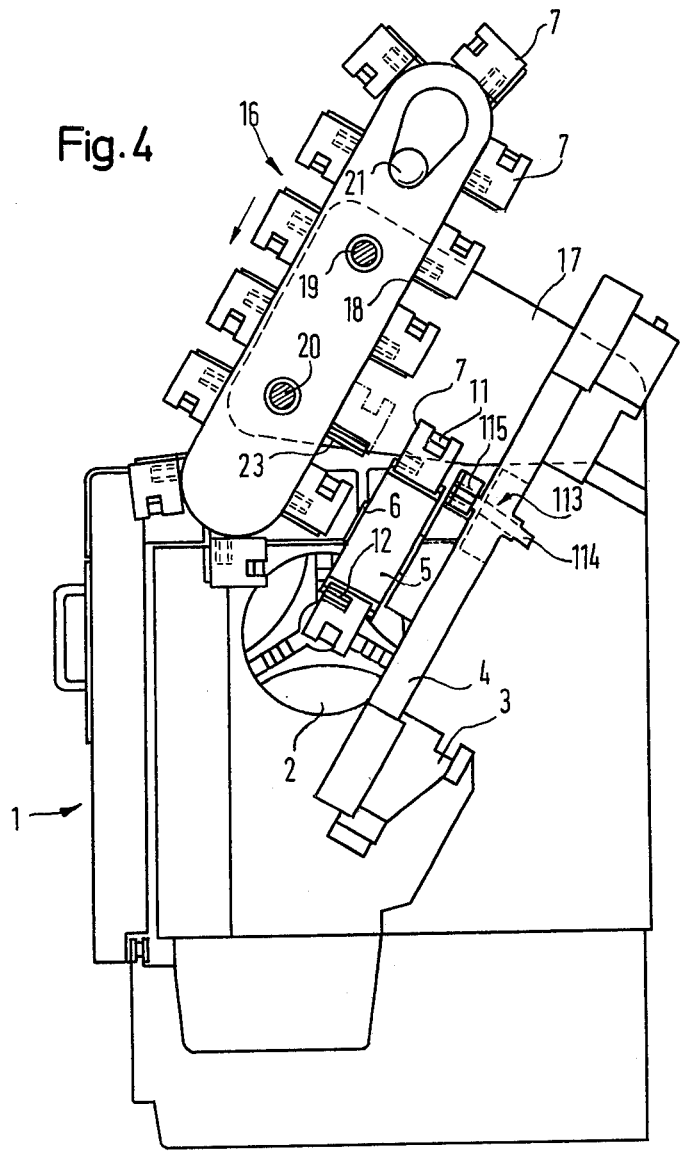

APPARATUS FOR CHANGING THE TOOL HOLDERS CARRYING MOUNTED TOOLS ON A MACHINE TOOL

BACKGROUND OF THE INVENTION

The invention relates to apparatus for changing the tool holders, each carrying a tool, on a machine tool. It relates particularly to apparatus for changing tools for a lathe, where the lathe has a primary or bed slide, a secondary or face slide supported by the primary slide for transverse movement relative thereto, and a tool turret supported by the secondary slide, the tool turret being furnished with at least two clamping devices for releasably retaining tool holders; in this invention, at least one movable tool holder magazine is supported independently of the slides and is located above the turret for enabling each of a series of tool holders to be moved along a path having a straight portion parallel to the traversing direction of one of the slides, usually the second slide. The invention also relates to a tool holder transfer device for the changeover of tool holders between the magazine and the turret and vice versa.

The known prior art includes turning lathes in which a tool holder magazine, a tool holder transfer device, and a turret, are arranged on the secondary slide (See German Offenlegungsschrift 1,602,815. Such prior-art devices ensure that a change of tool holders can take place at any time while a workpiece is being machined, independently of the location of the turret. This prior-art arrangement, however, suffers the disadvantage that the magazine has to be kept fairly small in size or else the weight of the magazine loads the slide guides too heavily and, as a result, has a bad effect on the feed tolerances when braking or starting up the slide.

For larger magazines, therefore, the trend has been to arrange the magazine to be separately movable. Another prior-art device (See German Offenlegungsschrift 1,804,603) has the magazine and the tool transfer device fixed to a trolley, which travels in two coordinate directions on a frame. The two coordinate directions coincide with the two displacement directions of the slides. This arrangement allows the magazine and the tool holder transfer device to be displaced synchronously with the turret. In other words, the trolley in this prior-art device is always brought into a position in which the tool holder transfer device is situated directly above the exchange position of the turret. The magazine of this prior-art device includes an endless chain belt extending parallel to the sliding direction of the longitudinal or primary slide. The tool holders can be mounted on the circulating magazine in such a way that a tool holder which is to be changed, or a corresponding vacant station on the magazine, comes to rest directly above the change position of the turret when such a change is to be made.

The object of the present invention is to provide apparatus which is simpler and less costly than those of the types described above.

SUMMARY OF THE INVENTION

The present invention solves the problem by mounting the magazine independently of the slides to slide along members supported by the lathe from sliding in the displacement direction of only one of the slides, while a straight portion of an endless loop path for the tool holders on the magazine lies parallel to the displacement direction of the other slide and is at least as long as the displacement range of the turret in the displacement direction of this other slide. Also, the magazine is arranged generally above and directly opposite to the displacement range of the turret. Further, the transfer device is mounted on the secondary slide.

The solution provided by the present invention retains all the advantages of the previously known devices in which the magazine is arranged on a trolley running in both directions, but this invention eliminates the drive and the guides for displacement of the magazine in one direction.

The solution provided by this invention is of advantage particularly with lathes where the face slide is arranged on an incline. If such lathes were to use a trolley for securing the magazine which could run in two directions on corresponding guides, then one of the trolley guides would have to run at a slope, and the load of the corresponding trolley drive would always be to one side. This disadvantage is obviated by the present invention, where the magazine is seated to slide only in the direction of movement of the bed slide, and the straight path of the tool holders on the magazine lies parallel to the traversing direction of the face slide.

In the invention, the magazine can be movable along at least one cylindrical guide rod, while adjacent to this guide rod, a screw spindle lies parallel to the rod and is used for moving the magazine along the guide rod.

In order to ensure synchronous displacement of the turret and magazine, according to a further development of the invention, a displacement control device can be provided, by means of which the displcement drive is appropriately monitored.

Normally, the tool holder change is programmed in advance and takes place automatically. In order, in the present case, for the magazine's corresponding vacant station to receive a tool holder to be changed, the magazine always comes into place above the exchange point of the turret; it is proposed according to a further development of the invention to provide a rotation control device, by means of which the rotary drive of the magazine can be monitored correspondingly.

A preferred form of the transfer device may include a piston-cylinder arrangement mounted on the secondary slide directly below the magazine change position, and a clamp for a tool holder, the centerline of which lies parallel to the slide normals or makes a small acute angle with regard thereto. The piston-cylinder arrangement in this case offers a particularly simple and inexpensive component, because only a linear movement is essential for the transfer.

A production example of the invention is described below based on the drawings.

BRIEF DESCRIPTION OF THE DRAWINGS

In the drawings:

FIG. 3 is a view in side elevation of the lathe shown in FIGS. 1 and 2, where, however, the single mounting for the guide and for the magazine drive has been omitted for greater clarity.

FIG. 4 is a view like FIG. 3 of a modified form of the invention including a modified form of transfer device.

DESCRIPTION OF SOME PREFERRED EMBODIMENTS

Figure 1:
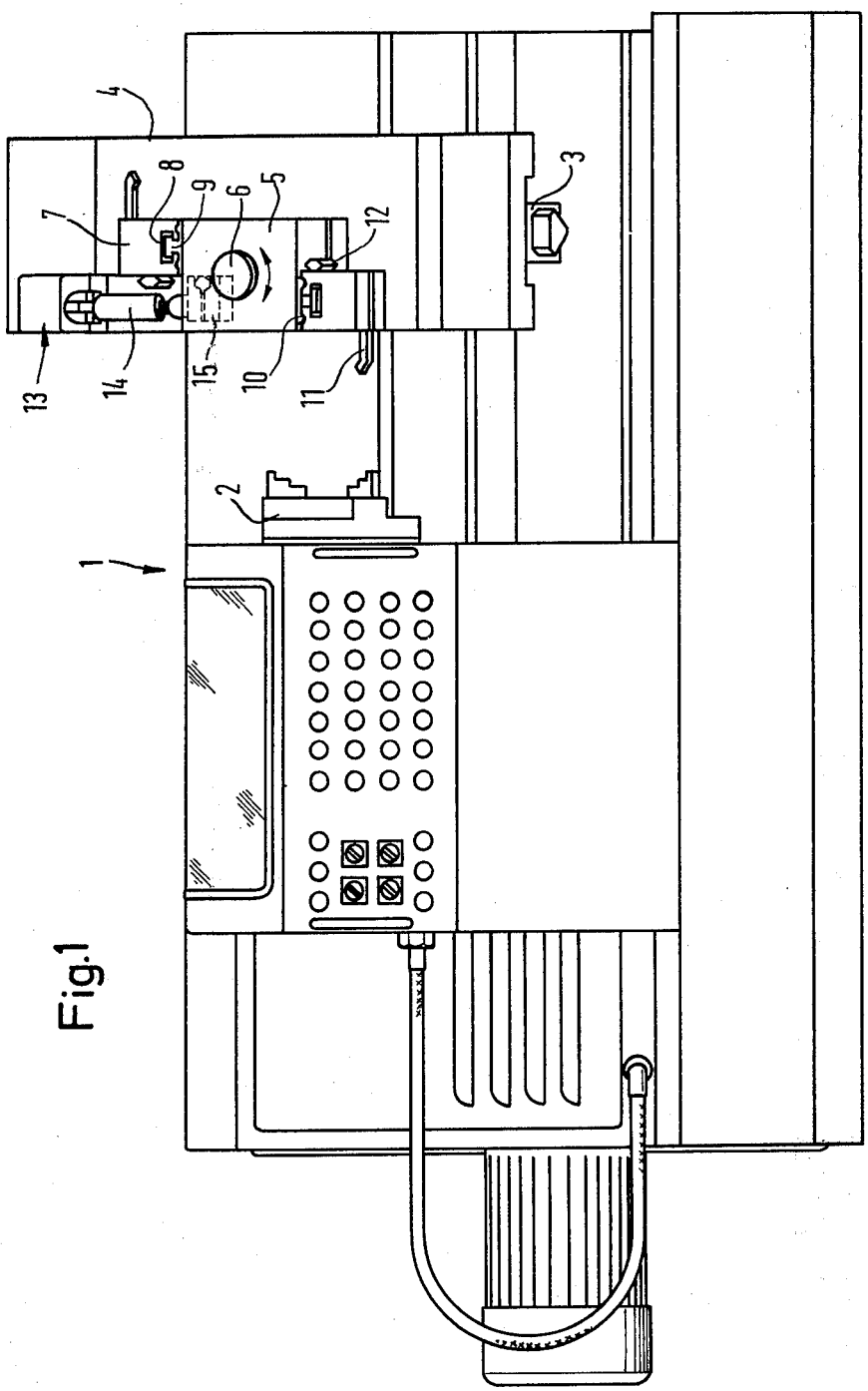
FIG. 1 is a view in front elevation of a lathe with an inclined face slide on which a turret and transfer device embodying the principles of the invention are arranged, the magazine having been omitted for greater clarity.
Figure 2:
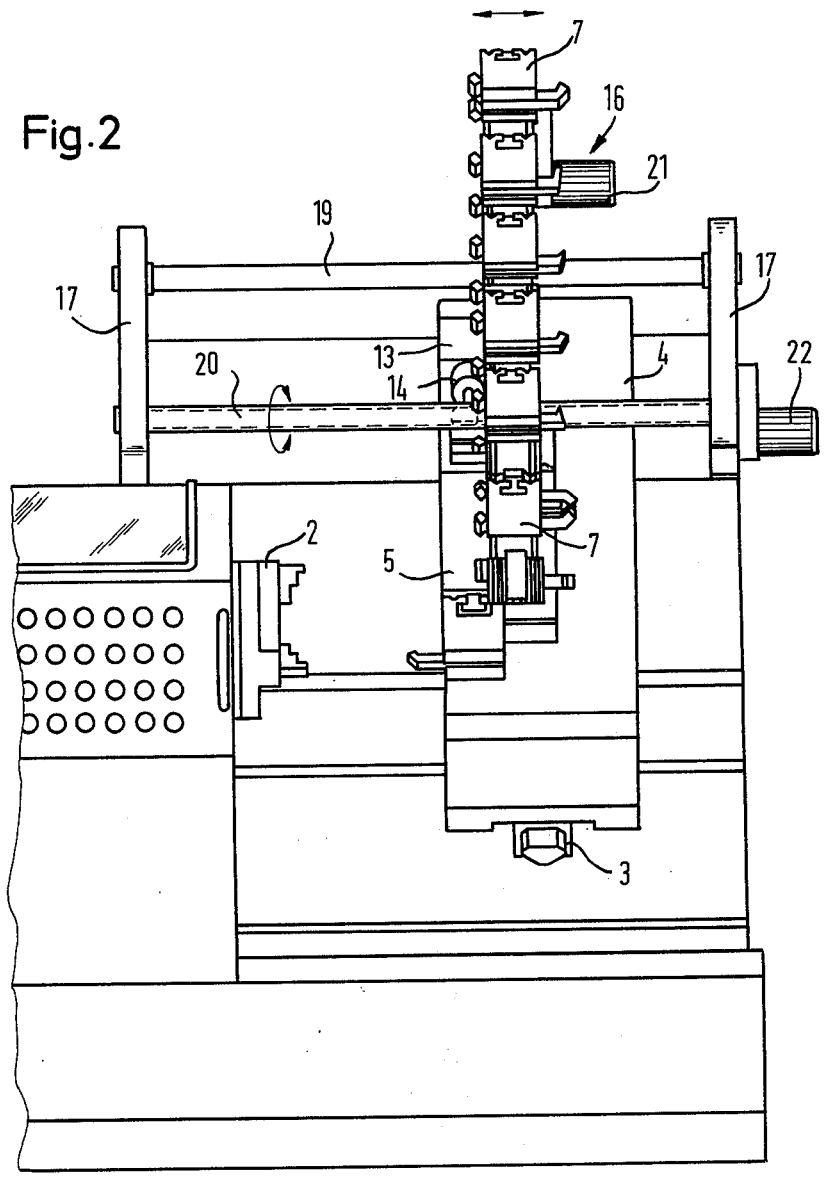
FIG. 2 is an enlarged fragmentary view of the right-hand end of FIG. 1, with the magazine shown.

In the device of FIGS. 1–3 a lathe 1 is provided with a frame 1a, a chuck 2 and a bed slide 3, mounted, by way of example, on an incline as shown in FIG. 3, for sliding toward and away from the chuck 2 on rails 3a, 3b. A face slide 4 is mounted on the bed slide 3 for transverse movement with respect thereto. A turret 5 is mounted on the face slide 4 for swivelling movement up to 180° about an axis rod 6. In FIG. 1, the turret 5 is shown provided with two tool holders 7 and 7a, each carrying a tool 11 or 11a. Each tool holder 7, 7a has a tee groove 8 and is secured by means of a drawing die 9, which engages into the corresponding tee groove 8 of the corresponding tool holder 7 or 7a. The tool holder 7 or 7a thus is pressed against guide ribs 10 on the turret 5.

Each tool holder 7, 7a is provided with a prism 12 on one side to enable engagement by a clamp 15 of a tool holder transfer device 13. The transfer device 13 is supported on the face slide 4, and its clamp 15 is articulated at the end of a telescopic arm 14, which may be actuated hydraulically and which, as will be seen from FIG. 3, can be swivelled upwardly and can be elongated at the same time. The clamp 15 can also be operated hydraulically. In swivelling upwardly and elongating the telescopic arm 14, the articulated connection between the clamp 15 and the telescopic arm 14 may be operated hydraulically in such a way that the clamp 15 retains its position parallel to the face slide 4.

As shown in FIGS. 2 and 3, a tool holder magazine 16 is arranged generally above the face slide 4 and supported independently of it. The magazine 16 may comprise an endless chain belt having a frame 16a defining a loop and holding a series of tool holders 7b, 7c . . . 7n at suitable stations. Each station has an arbor 23 for receiving and releasably locking in place a tool holder. The frame 16a has a straight portion 18 and semicircular ends, and the straight portion 18 lies parallel to the direction of displacement of the face slide 4, so that the endless chain belt runs parallel to that direction as it moves along the straight portion 18. The straight portion 18 is at least as long as the maximum displacement range of the face slide 4 or of the turret 5 arranged on the face slide 4. Here, the magazine 16 is shown disposed in relation to the turret 5 in such a way that the start and the finish of the straight portion 18 of the frame 16a coincides with the start and finish of the displacement range of the change position at the turret 5. The magazine 16 lies generally above the turret 5 and has a location directly opposite the change position of the turret 5.

The magazine 16 is seated to slide forward and back on a guide rod 19, here shown as cylindrical, which extends between two generally vertically holding members 12 that are secured to the lathe frame 1a (See FIGS. 2 and 3). A screw spindle 20 supported by the members 12 parallel to the guide rod 19 engages a corresponding interiorly threaded member 20a of the magazine frame 16a. The screw spindle 20 is coupled to a displacement drive or crank 22. Furthermore, a crank or other circulating drive 21 is provided on the magazine 16 to drive the chain and thereby move the tool holders 7b, 7c . . . 7n in one direction or the other.

In operation, the magazine 16 is displaced, synchronously with the turret 5, in the direction of the bed slide 3. To ensure this synchronous action a control device, not shown, is provided. In order to move a programmed tool holder 7 or a vacant station of the magazine corresponding to a specific work programme, to a location over the change position of the turret 5, a circulation control device is additionally provided, and this also is not shown.

A modified production example of the invention shown in FIGS. 1 to 3 is portrayed in FIG. 4. This production examples provides a transfer device 113 that includes a hydraulic piston-cylinder-arrangement 114, which is arranged on the face slide 4 directly below the change position of the turret 5. To the end of the piston 116 of the arrangement 114 which projects from the end of the cylinder, is secured a hydraulically operated clamp 115. The transfer device 113 of FIG. 4 is often preferred over the transfer device of FIGS. 1 to 3, and it is much simpler. It is worth noting that the piston cylinder arrangement 114 is so located that it makes a small acute angle to a normal to the plane of the face slide 4. The clamp 115 on the other hand is disposed in such a way that the clamp channel surrounding it runs parallel to the above-mentioned normal. The purpose of this arrangement is the object of German Patent Application P 22 34 676.5 by the present applicant and is fully described therein.

The transfer of tool holders 7, 7a . . . 7n between the magazine 16 and the turret 5 by means of the structure of FIG. 4 will now be described. The instance will first be considered where a tool holder 7 is to be moved from the change position of the turret 5 into a vacant station in the magazine 16. The chain belt is moved so that the desired vacant station is moved accurately to a location opposite the tool change position on the turret 5, as shown in FIG. 4, the turret 5 and magazine 16 lying parallel to each other. This movement is brought about by a corresponding displacement of the magazine 16 in the longitudinal direction and a revolution of the chain belt of the magazine in one of its two possible directions of revolution. It should be remarked that as the turret 5 moves, the chain belt of the magazine 16 always moves along synchronously with the movement of the turret 5, back longitudinally and around its perimeter. Due to the fact that the abovementioned vacant station is now accurately located directly opposite the change position on the turret 5 (i.e., aligned with it in respect to a line perpendicular to both the plane of the magazine 16 and the plane of the turret 5), the transfer of the tool holder 7 can be made, by means of the transfer device 113, with a single linear movement. Then the clamp 115 on the piston 116 with its clamp claws stretched open is pushed out far enough for the clamp claws of the clamp 115 to encompass the prism 12 on the desired tool holder 7.

The clamp 115 is then loaded hydraulically and grips the prism 12 with its clamp claws. The drawing die 9 is now released, i.e., it is moved away a little from the turret 5 and releases the tool holder 7. With progressive continuation of the outward movement of the cylinder piston 115, the tool holder 7 can be conducted into the vacant station of the magazine 16 above it.

The tool holder 7 then is inserted into a corresponding receiving arbor 23 of the magazine 16 and is clamped tightly by means of a locking device. Subsequently, the clamp 115 is released from the prism 12 and the piston 116 moves down into its initial position.

It is however, possible for the piston 116 to be moved down only far enough so that the clamp 115 is located between the turret 5 and the magazine 16. Even in this position, the clamp 115 cannot collide with the tool holders 7, etc., in the magazine 16 when the chain belt of the magazine 16 is circulating. The retention of the clamp 115 in this intermediate position has the advantage that stroke travel, and therefore time, is saved.

If now a different tool holder 7b is to be transferred from the magazine 16 into the change position of the turret 5, which has now become vacant, then, first, the interrupted circulation drive for the magazine 16 is switched on again until the tool holder 7b for the next work process appears directly opposite the above-mentioned change position of the turret 5. The transfer of this tool holder 7b then takes place, in that the piston 116, along with the clamp 115, is moved out to enable the claws on the clamp 115 to grip the prism 12 of this tool holder 7b. The tool holder 7b is moved over then into the change position of the turret 5 by means of a retracted movement of the piston 116. The clamp 115 in this position then releases the prism 12 of the tool holder 7. A final movement restores the piston 116 again to its initial position.

The tool change in the production example shown in FIGS. 1 to 3 takes place in a similar manner. Here the telescopic arm 14, with simultaneouss extension or withdrawal, carries out a swivelling movement, at which the space encompassed by the claws of the hydraulically operated clamp 15, is always held parallel to a plane normal to the face slide 4. This procedure is shown in broken lines in FIG. 3.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:
1. Apparatus for changing tool holders carrying tools used on a lathe having a main frame, a bed slide longitudinally slidable on said main frame, a face slide slidably mounted on said bed slide for transverse movement with respect thereto and inclined to the horizontal said apparatus including in combination:
   a tool turret rotatably supported by said face slide and having at least two tool holder clamping devices,
   at least one movable tool holder magazine supported by said main frame for slidable movement in the same direction as said bed slide and positioned generally above said face slide and above the turret,
   said magazine having a series of arbors, each carrying a tool holder, and having means for indexing said arbors around a closed loop having a straight portion lying in a plane perpendicular to the longitudinal displacement direction of said bed slide and being at least as long as the displacemnt range of the turret in the displacement direction of said face slide, and arranged generally above and directly opposite said-mentioned displacement range of said turret,
   said magazine itself being displaceable only in the displacement direction of said bed slide, and
   said indexing movement of said arbors and their tool holders on said magazine lying parallel to the displacement direction of said face slide,
   tool holder transfer means supported by said face slide for transferring tool holders between said magazine and said turret.

2. The apparatus of claim 1 wherein said magazine is slidable along said longitudinal direction on a stationary rod supported by said main frame.

3. The apparatus of claim 2 including a threaded spindle supported by said main frame to which said magazine is threaded parallel to said rod for moving said magazine along said rod.

4. The apparatus of claim 1 including displacement drieve means for said maagazine and said turret for indexing said magazine and said turret synchronously along said face slide.

5. The aparatus of claim 1 including revolving drive means for indexing said tool holders on said magazine, said revolving drive means having circulation control means enabling a chosed tool holder or a vacant station on the magazine to be moved to a position directly opposite the corresponding vacant place or tool holder on the turret respectively, for change thereof.

6. The apparatus of claim 1 wherein said transfer device is made up of a piston-cylinder arrangement supported on said face slide in line with the change position of said magazine and carrying a clamp for a said tool holder, the axis of the piston-cylinder arrangement lying generally parallel to a plane of said face slide while adjacent said turret and being pivotable in a plane normal to said face slide to bring said clamp adjacent said tool magazine.

* * * * *